United States Patent
Tanner et al.

(10) Patent No.: US 6,423,224 B1
(45) Date of Patent: *Jul. 23, 2002

(54) FILTER CARTRIDGE ASSEMBLY FOR WATER TREATMENT DEVICE

(75) Inventors: John D. Tanner; David J. Emmons, both of Plymouth; Erik G. Orwoll, Minnetonka, all of MN (US)

(73) Assignee: The Procter & Gamble Company, Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/268,223

(22) Filed: Mar. 15, 1999

Related U.S. Application Data

(62) Division of application No. 08/640,205, filed on Apr. 30, 1996, now Pat. No. 5,882,507.

(51) Int. Cl.⁷ .............................................. B01D 24/12
(52) U.S. Cl. ........................ 210/247; 210/269; 210/273; 210/274
(58) Field of Search ................................ 210/247, 464, 210/466, 469, 473–477, 482, 248, 472, 232, 299, 263, 282

(56) References Cited

U.S. PATENT DOCUMENTS

| | | | | |
|---|---|---|---|---|
| 150,866 A | * | 5/1874 | Klobassa | 210/748 |
| 165,512 A | * | 7/1875 | Scherr | 210/247 |
| 498,967 A | * | 6/1893 | Benham | 210/472 |
| 815,102 A | | 3/1906 | Lea | |
| 871,253 A | | 11/1907 | Bauman | |
| 1,148,943 A | | 8/1915 | Young | |
| 1,208,882 A | * | 12/1916 | Young | 210/247 |
| 1,432,522 A | * | 10/1922 | Barnes et al. | 210/247 |
| 1,775,355 A | * | 9/1930 | Peters et al. | 210/247 |
| 2,669,707 A | | 2/1954 | Ehrman | |
| 3,687,289 A | | 8/1972 | Tischler | |
| 4,623,457 A | | 11/1986 | Hankammer | 210/472 |
| 4,650,571 A | | 3/1987 | Anderson | |
| 4,698,164 A | | 10/1987 | Ellis | |
| 4,895,648 A | | 1/1990 | Hankammer | 210/472 |
| 4,918,426 A | | 4/1990 | Butts et al. | |
| 4,969,996 A | | 11/1990 | Hankammer | 210/476 |
| 4,998,228 A | | 3/1991 | Eger et al. | |
| 5,057,821 A | | 10/1991 | Card | |
| 5,065,901 A | | 11/1991 | Brane et al. | |
| 5,089,144 A | | 2/1992 | Ozkahyaoglu et al. | |
| 5,128,034 A | | 7/1992 | Kool | |
| 5,139,666 A | | 8/1992 | Charbonneau et al. | |
| 5,190,643 A | | 3/1993 | Duncan et al. | |
| 5,236,578 A | | 8/1993 | Oleskow et al. | |
| 5,328,597 A | | 7/1994 | Boldt, Jr. et al. | |
| 5,435,909 A | | 7/1995 | Burrows | |
| 5,457,665 A | | 10/1995 | Reid | |
| 5,486,285 A | | 1/1996 | Feeney | |
| 5,536,394 A | | 7/1996 | Lund et al. | |
| 5,536,396 A | * | 7/1996 | Mudra et al. | 210/470 |
| 5,562,824 A | * | 10/1996 | Magnusson | 210/476 |
| 5,665,224 A | | 9/1997 | Levene et al. | |
| 5,785,844 A | | 7/1998 | Lund et al. | |
| 6,103,114 A | * | 8/2000 | Tanner et al. | 210/472 |

FOREIGN PATENT DOCUMENTS

| | | |
|---|---|---|
| DE | 35 35 679 A1 | 5/1987 |
| DE | 37 37 476 C1 | 10/1988 |
| JP | 3284394 | 12/1991 |

* cited by examiner

Primary Examiner—Joseph W. Drodge
(74) Attorney, Agent, or Firm—Merchant & Gould P.C.

(57) ABSTRACT

A filter cartridge end-of-life mechanism and a filter cartridge assembly for a water treatment device. The end-of-life mechanism comprises a float which is moved along an escapement path each time the device is filled. A counting mechanism connected to the float provides a continuous visual indication of the amount of useful life remaining in the filter cartridge. The cartridge assembly includes a tray detachably connected to a filter cartridge. The tray is positioned beneath the outlet end of the cartridge to remove water treatment particles from the treated water.

6 Claims, 4 Drawing Sheets a carafe is shown herein, it will be understood that the invention could be employed in a variety of other gravity-fed devices, such as in a larger reservoir having a pour spigot or in a coffee machine.

FILTER CARTRIDGE ASSEMBLY FOR WATER TREATMENT DEVICE

This application is a divisional of Application Ser. No. 08/640,205, filed Apr. 30, 1996, issued as U.S. Pat. No. 5,882,507 on Mar. 16, 1999, which application is incorporated herein by reference.

FIELD OF THE INVENTION

This invention relates to water treatment devices, such as gravity-fed devices, and to filter cartridges used in such devices. In particular, this invention relates to a fill-counting cartridge and a cartridge assembly which removes water treatment particles from the treated water.

BACKGROUND OF THE INVENTION

Domestic water treatment devices are known in the art. They include in-line devices (e.g., under the sink), terminal end devices (e.g., counter top or faucet mounted), and self-contained systems which process water in batches. Examples of batch devices are pitchers/carafes and larger reservoirs where treated water is poured for example from a spigot. Batch water treatment systems can also be incorporated into other devices, such as a coffee maker. These self-contained systems typically have upper and lower chambers separated by a filter cartridge. They rely on gravity to force water from the upper chamber, through the cartridge, and into the lower chamber, thereby producing treated water.

Mechanical filters, which treat water by preventing particulates from passing through them, provide a ready end-of-life indication through reduced flow due to particulate accumulation. Chemical removal media (e.g., charcoal based media and ion exchange media) employ processes such as adsorption and ion exchange for treating water. These processes do not reduce flow or provide other end-of-life indication.

Various approaches have been taken to provide end-of-life indication where it is not inherently provided by the media. It is known for example to "totalize," mechanically or electronically, the volume of water that has been treated. The mechanical approach typically involves a turbine and gear reduction mechanism. The electronic approach typically involves a pressure transducer and a microprocessor which integrates to calculate volume. Such systems are relatively expensive, however, and do not lend themselves well to batch treatment devices.

In batch treatment systems, it is known to approximate the amount of water that has been treated by counting the number of times the device has been filled. Such a prior art device is described in U.S. patent application Ser. No. 08/341,420, filed Nov. 17, 1994, now U.S. Pat. No. 5,536,394. The '341 fill-counting system employs a float which rotates one revolution on a threaded rod each time the device is filled. One short-coming of this approach is that there is no continuous visual indication of the amount of useful life remaining, but only an indication at the end of life.

Where relatively loose particle media are employed, such as the loose granular activated carbon and resins typically used in batch systems, media particles tend to come out of the cartridge with the treated water. Although ingesting these particles is generally not a significant health concern, consumers consider it undesirable to see what appears to be sediment in the treated water. An example of a gravity-fed system where this is a shortcoming is shown in U.S. Pat. No. 4,969,996.

What has been needed is a novel fill-counting mechanism which provides a continuous visual indication of the amount of useful life remaining in the filter cartridge. What has also been needed is a novel filter cartridge assembly which reduces the number of media particles in the treated water.

SUMMARY OF THE INVENTION

Certain aspects of this invention involve a filter cartridge end-of-life mechanism for a gravity-fed water treatment device. Although a carafe is shown herein, it will be understood that the invention could be employed in a variety of other gravity-fed devices, such as in a larger reservoir having a pour spigot or in a coffee machine.

In one aspect of the invention, the end-of-life mechanism comprises a float which rises when the water treatment device is filled, and falls after the water has been treated. A counting mechanism counts the number of times the water treatment device has been filled. The mechanism includes an escapement mechanism wherein the float is advanced along an escapement path each time the float rises and falls.

In another aspect of the invention, the end-of-life mechanism comprises a mechanism for counting the number of times the water treatment device has been filled. The fill-counting mechanism includes a member which is moved by the water. A visual indicating mechanism cooperates with the fill-counting mechanism to provide a continuous visual indication of the amount of useful life remaining in the filter cartridge.

In certain other aspects of the invention, the invention comprises a filter cartridge assembly which reduces water treatment particles in the treated water. Although a gravity-fed system is disclosed herein, the invention could also be employed in systems where the water is forced through the media by other than gravity.

In another aspect of the invention, the invention comprises a filter cartridge assembly for a water treatment device. The assembly includes a filter cartridge containing water treatment material and having an upper inlet end and a lower outlet end. A tray is positioned beneath the lower outlet end. It is detachably connected to the filter cartridge and separable from the water treatment device. The tray is constructed and arranged so that treated water flowing from the outlet end flows generally toward the inlet end and out of the tray. The tray holds particles of water treatment material coming from the outlet end, thereby making the treated water flowing out of the tray substantially free of the particles.

BRIEF DESCRIPTION OF THE DRAWINGS

A preferred embodiment of the present invention will be described with reference to the accompanying drawings, wherein like reference numerals identify corresponding parts.

DETAILED DESCRIPTION OF THE PREFERRED EMBODIMENTS

Figure 2:
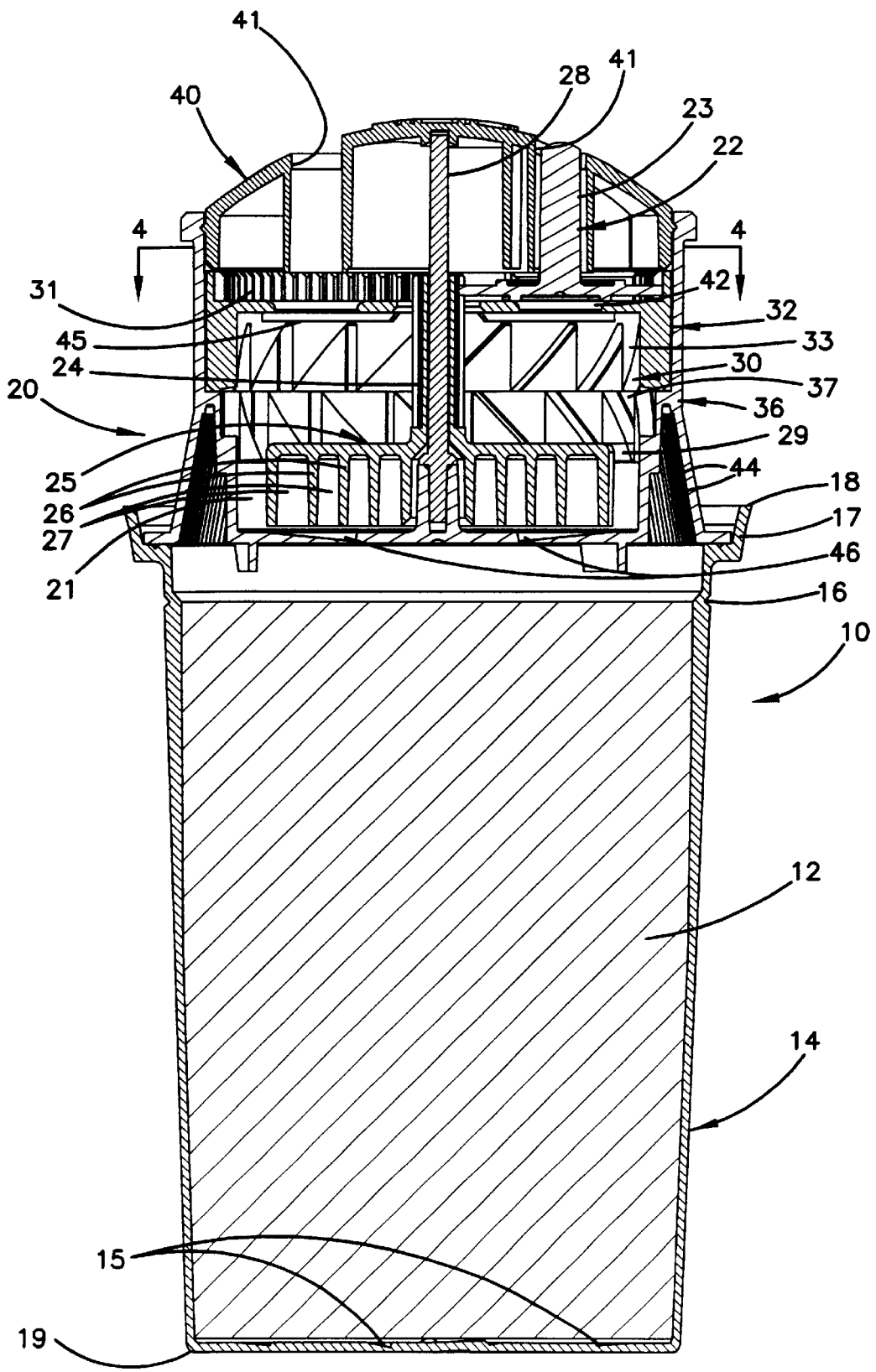
FIG. 2 is a cross-sectional view of a filter cartridge, including an end-of-life mechanism, according to the present invention.

The filter cartridge 10 described herein can be used in a variety of gravity-fed water treatment devices. Filter cartridge 10 is shown herein in a carafe 100 by way of illustration. Referring to FIG. 2, cartridge 10 includes mechanism 20 which counts the number of times that the water treatment device has been filled. While fill-counting mechanism 20 is shown incorporated in filter cartridge 10, it could also be employed separately from a filter cartridge and therefore reused.

Fill-counting mechanism 20 includes float 25 which is advanced along an escapement path each time the water treatment device is filled. Float 25 includes a plurality of downwardly extending annular walls 26 which form channels 27 beneath float 25. Channels 27 trap air so as to cause float 25 to rise when it is submerged.

An "escapement" is a mechanism by which a member is advanced along a path (usually circular) through a repeated movement between two discreet stopped positions. An example of an escapement path can be found in a pendular clock. Escapement paths other than that described herein could be used within the principles of the invention. For example, the escapement path could be linear instead of circular. Also, as with the pendulum of a clock, the member moving between two discreet positions need not be the same member which is advanced along the escapement path. The shape of the escapement path could also be different from the saw-toothed path described herein.

Figure 3:
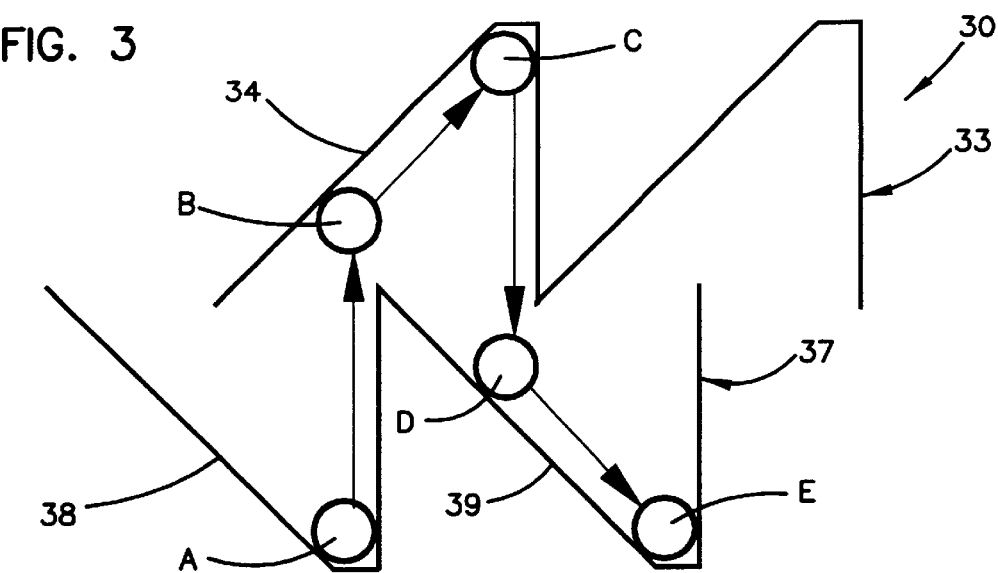
FIG. 3 is a schematic diagram of an escapement path according to the present invention.

The preferred escapement path 30 comprises upper 33 and lower 37 paths formed in upper 32 and lower 36 escapements, respectively. As best shown in FIG. 3, upper 33 and lower 37 paths are generally saw toothed and offset from one another.

Float 25 advances along escapement path 30 as follows. Referring to FIGS. 2 and 3, as float 25 rises along center post 28, pin 29 (the preferred float includes a plurality of pins) is raised from first tooth 38 of lower path 37 (position A) to first tooth 34 of upper path 33 (position B). Pin then travels along first tooth 34 from position B to C as float 25 rises further. When float falls, pin 29 drops to second tooth 39 of lower path 37 (position D) and further to position E. Thus, each time float 25 rises and falls, it is advanced one tooth along escapement path 30.

Figure 4:
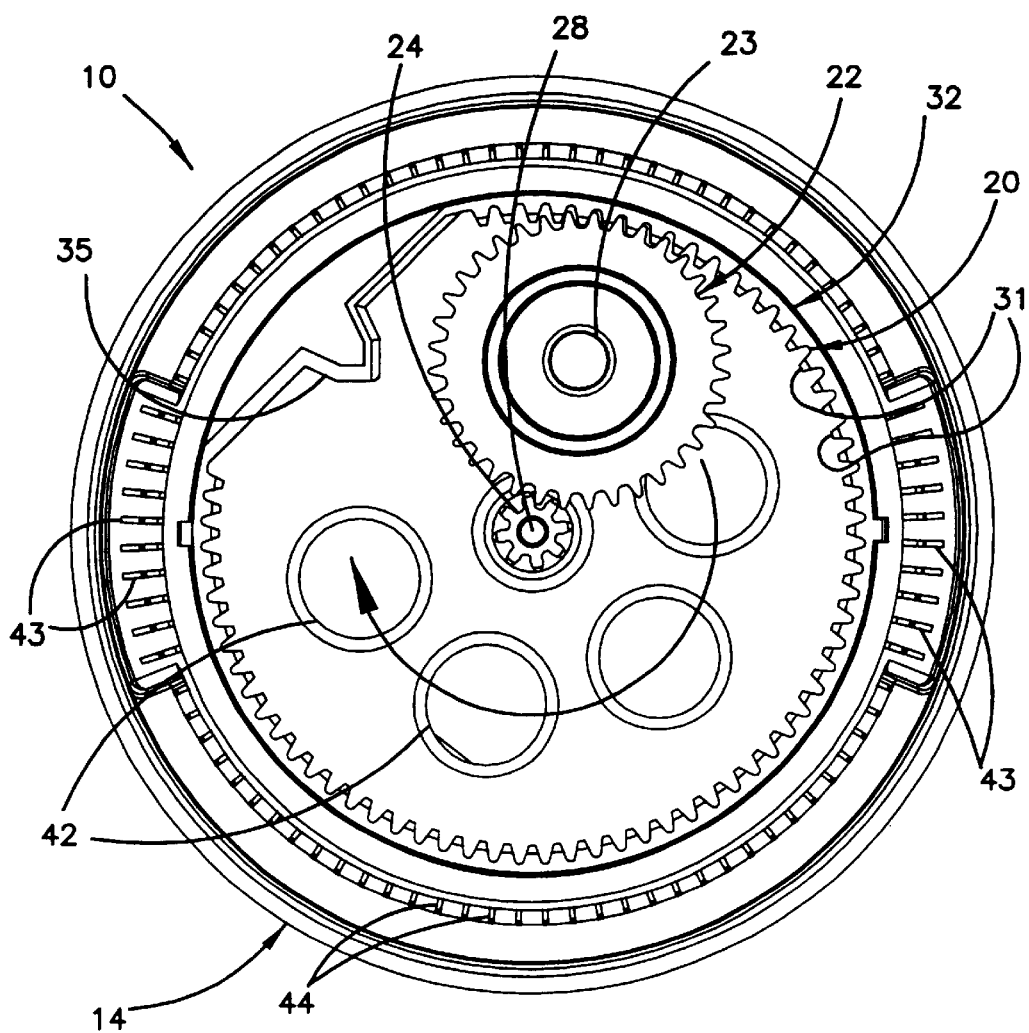
FIG. 4 is a top view of the filter cartridge end-of-life mechanism shown in FIG. 2, taken generally along line 4—4 of FIG. 2.

Fill-counting mechanism 20 provides a continuous visual indication of the amount of useful life remaining in filter cartridge 10 as follows. Referring to FIGS. 2 and 4, gear 24 on float 25 engages planetary gear 22 which is advanced in a circular path along teeth 31 of upper escapement 32 as float 25 rotates. Planetary gear 22 includes stem 23 which is visible through one or more openings 41 in cover 40. Planetary gear 22 travels clockwise (see arrow in FIG. 4) until it reaches stop 35 in upper escapement 32. Appropriate indications are provided on cover 40 to tell the user when for example one-half of the cartridge life is remaining and when it has reached end of life.

A variety of continuous visual indicating mechanisms other than that disclosed herein could be employed within the principles of the invention. For example, the mechanism could employ a member moved by the water, such as a paddle wheel, which is not a float. An indicating member could be connected to the member which is moved by the water in various ways. The mechanism also need not involve an escapement path.

Water flows through filter cartridge 10 as follows. Water enters through openings 41, 43 in cover 40 and lower escapement 36, respectively and through circular inlet holes 42 in upper escapement 32 to fill float chamber 21. Downwardly protruding ribs 45 are provided on upper escapement 36 in order to break the surface tension between upper escapement 32 and float 25 when the water level drops, thereby assuring that float 25 will fall. The water proceeds from float chamber 21 through slots 46 at bottom of lower escapement to media 12. Water also directly enters media 12 through slots 44, which are provided in the lower portion of lower escapement 36 so that substantially all of the water in the upper chamber of the water treatment device enters filter cartridge 10. Treated water then exits filter cartridge 10 from slots 15 in the bottom of housing 14.

A filter cartridge assembly 50 according to the present invention will now be described with reference to FIGS. 1 and 5. It will be understood that although assembly 50 is shown incorporated in a carafe 100, it could also be employed in a variety of other water treatment devices within the principles of the invention.

Figure 1:
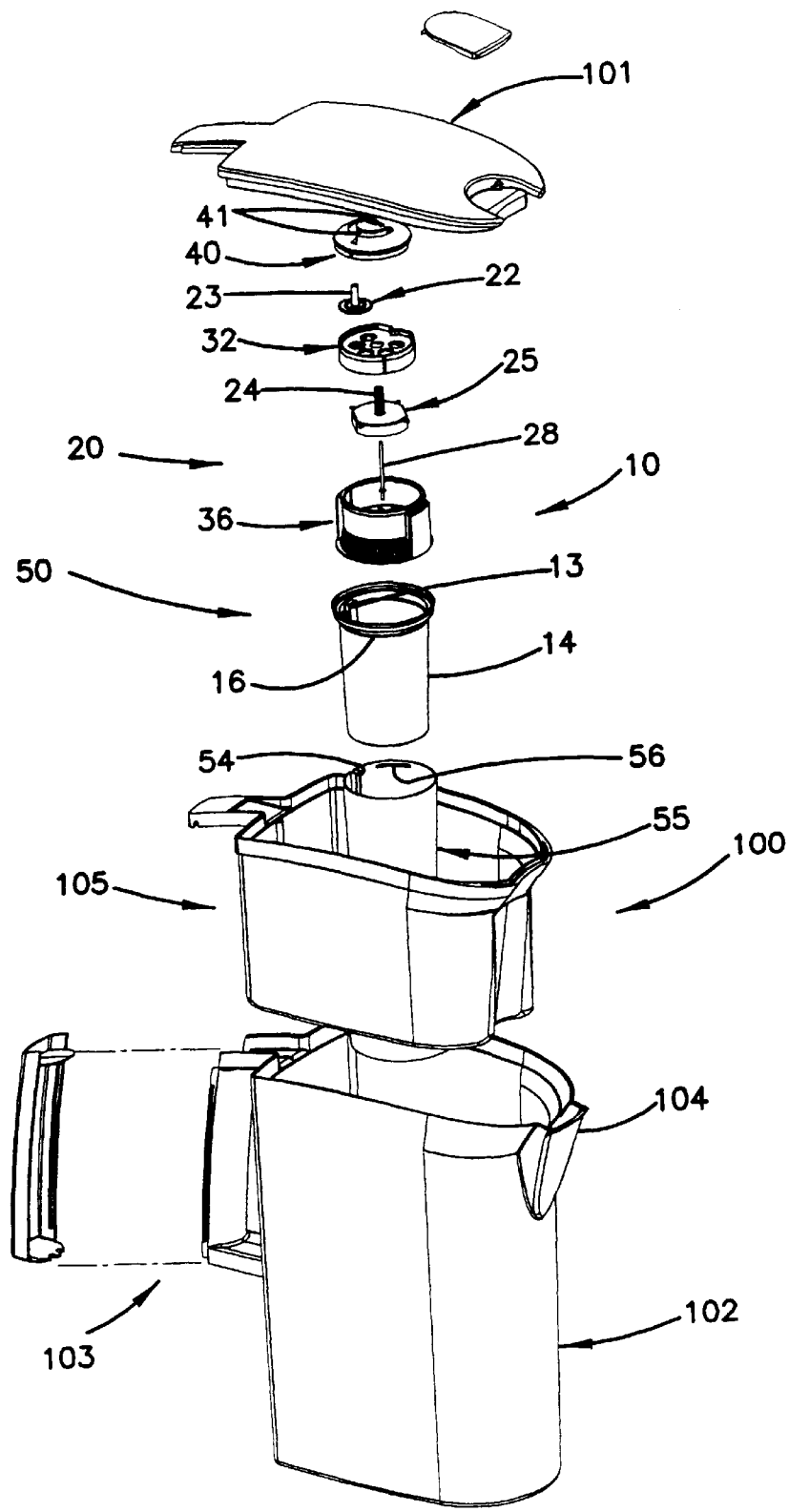
FIG. 1 is an exploded perspective view of a water treatment device according to the present invention.

Filter cartridge assembly 50 is shown in FIG. 1 in carafe 100. Carafe 100 includes funnel 105 forming an upper chamber for contaminated water and a pitcher 102 forming a lower chamber for treated water. Pitcher 102 includes handle 103 and pour spout 104. When carafe 100 is assembled, funnel 105 is inserted into pitcher 102 and cover 101 is placed on top.

Figure 5:
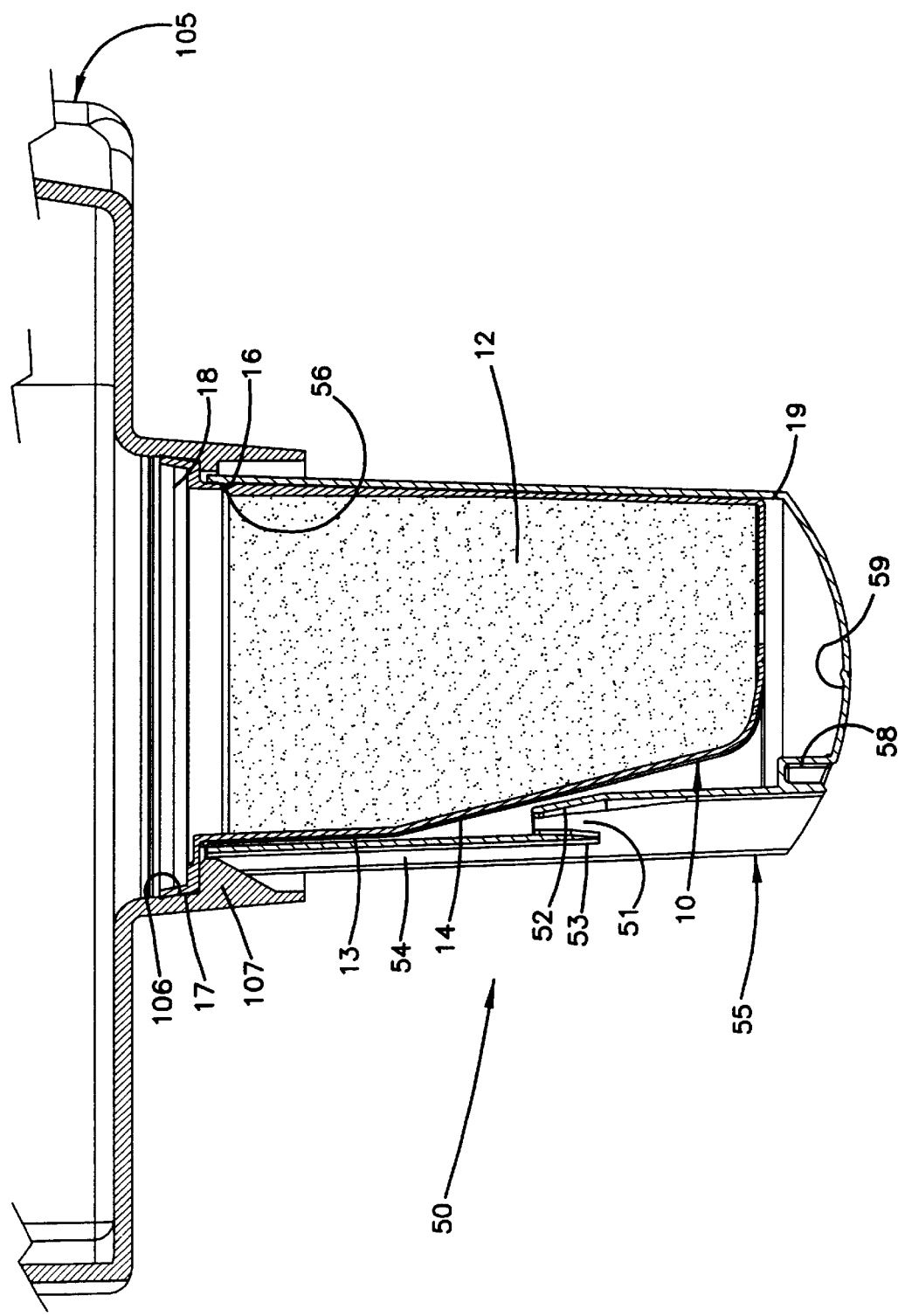
FIG. 5 shows a cross-sectional view of a filter cartridge assembly according to the present invention.

The preferred filter cartridge assembly 50 is shown in FIG. 5. Assembly 50 includes filter cartridge 10 and cup 55 releasably attached to cartridge 10 by three inwardly facing protrusions 56, spaced at 120° intervals, which snap fit into corresponding detent 16 in cartridge 10. Cartridge 10 is sealed to downwardly extending. sealing surface 106 of funnel 105 by an appropriately elastic sealing lip 17 around the perimeter of the upper end of housing 14. Channel 54 of cup 55 is received in recess 13 in filter housing 14. Key 107, which in turn fits into channel 54 of cup 55, is for the purpose of properly aligning cup 55 and cartridge 10 relative to funnel 105.

Cup 55 is constructed and arranged to prevent particles of water treatment media 12 from entering the lower chamber (here, pitcher 102) of the water treatment device. This is particularly a concern in gravity-fed devices, where loose media particles such as granular activated carbon and ion exchange resins are employed. Contaminated water entering upper inlet end 18 expels media particles 12 from lower outlet end 19 and into bottom 59 of cup 55. The particles are held in bottom 59 of cup 55 as. treated water passes upwardly. Treated water flows out of cup 50 through gap 51 between inside wall 52 and outside wall 53, which acts as a deflector plate to direct the treated water downwardly. Notch 58 assists this flow by reducing the surface tension of the water with the underside of bottom 59 of cup 50. Where the water treatment device is a pitcher 102, gap 51 is preferably located on the same side as handle 103 to keep particles from coming out of cup 55 when pouring.

In this way, cup 55 acts as a tray which prevents media particles from entering pitcher 102. When it is time to replace filter cartridge 10, cup 55 can be removed, rinsed, and reattached to the next filter cartridge. Cup 55 could be constructed in a variety of other ways within the principles of the invention to beneficially reduce the amount of media particles in the treated water.

It should be understood that the present invention is not limited to the preferred embodiment discussed above, which is illustrative only. Changes may be made in detail, especially matters of shape, size, arrangement of parts, or material of components within the principles of the invention to the full extent indicated by the broad general meanings of the terms in which the appended claims are expressed.

We claim:

1. A filter cartridge assembly for a water treatment device, comprising:

a filter cartridge containing water treatment material and having an upper inlet end and a lower outlet end; and a tray for trapping fine particles of the water treatment material, positioned beneath said outlet end, detachably connected to said filter cartridge and separable from the water treatment device, said tray having a closed bottom such that treated water flowing from said outlet end flows generally toward said inlet end, and having an exit opening formed in a side wall from which the treated water then flows out of said tray;

said tray and filter cartridge defining therebetween a space without water treatment material through which treated water flows.

2. The filter cartridge assembly of claim 1, wherein said tray is shaped generally as a cup which extends substantially to said upper inlet end.

3. The filter cartridge assembly of claim 1, wherein the tray includes an outside wall extending downwardly to form a deflector plate and an inside wall extending upwardly past a bottom end of said outside wall, such that the treated water flows out of said tray through a gap between said inside and outside walls.

4. The filter cartridge assembly of claim 1, wherein said tray includes a notch extending upwardly from a bottom of said tray to reduce the surface tension of the treated water on an underside of said bottom.

5. The filter cartridge assembly of claim 1, wherein said tray is connected to said filter cartridge proximate an upper end of said tray.

6. The filter cartridge assembly of claim 1, wherein said filter cartridge assembly is constructed and arranged for use in and is incorporated in a gravity-fed water treatment device.

* * * * *